United States Patent
Brown

[15] 3,702,477
[45] Nov. 7, 1972

[54] INERTIAL/DOPPLER-SATELLITE NAVIGATION SYSTEM
[72] Inventor: Robert G. Brown, Ames, Iowa
[73] Assignee: Iowa State University Research Foundation, Inc., Ames, Iowa
[22] Filed: June 23, 1969
[21] Appl. No.: 835,819

[52] U.S. Cl..........................343/112 C, 235/150.25
[51] Int. Cl..................................................G01s 5/00
[58] Field of Search .235/150.25, 150.27; 343/112.1, 343/100 ST

[56] References Cited

UNITED STATES PATENTS 2,914,763  11/1959  Greenwood, Jr. et al. ..................343/112 C UX
3,028,592  4/1962  Parr et al. ..........235/150.25 X Primary Examiner—Richard A. Farley
Assistant Examiner—Richard E. Berger
Attorney—Dawson, Tilton, Fallon & Lungmus

[57] ABSTRACT

Terrestrial navigation apparatus for a vehicle includes a system of inertial sensors generating signals representative of the position and velocity of the vehicle, a data processor, and a receiver for receiving data from a doppler satellite system including a signal of known frequency as well as signals representative of the satellite's position. The difference between the doppler frequency shift computed from the information received from the satellite and the doppler frequency shift computed by the inertial system is modeled as an observable in a Kalman filter programmed into the data processor to generate a set of error signals representative of estimates of the errors in the position and velocity signals generated by the inertial sensors. The error estimate signals are then used to correct the errors in the inertial sensors. In one disclosed embodiment, the external, observed parameter is a discrete frequency; whereas in an alternative system, it is a frequency count.

10 Claims, 15 Drawing Figures

INVENTOR
ROBERT G. BROWN
Dawson, Tilton, Fallon & Lungmus
ATTORNEYS

PATENTED NOV 7 1972

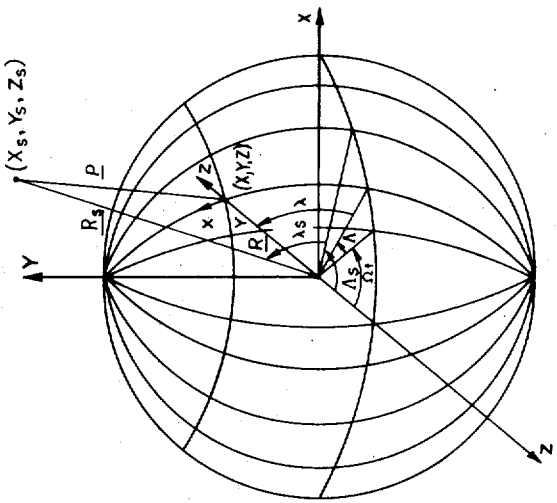

PAGE 0001

```
FORTRAN IV G LEVEL 1, MOD 3                MAIN                DATE = 69147          17/52/17

0001              C       KALMAN FILTER ESTIMATION OF ERROR IN DRS/A-SIGN III NAVIGATION SYSTEM
                          DOUBLE PRECISION SUM, GCLAT, GLONG, CXXC, CYXC, CX7C, CYXC, ALT,
                         1CYYC, CYZC, CZXC, CZYC, CZZC, XS, YS, ZS, RS, RCOM, RHO,TNEW,TOLD
                         1YP,AO,BO,CO,RHOOLD,RAD
0002                      DOUBLE PRECISION   CXZS,CYZS,CZZS,AN,BN,CN,RAN,T1,T2,T3,Q,YM,
0003                      DOUBLE PRECISION   C(16,16),TRANS(16,16), DUM(16,16), A(16,16),
                         1PDT(16,16), H(16,16), PN(16,16), XN(16), XO(16), PHI(16,16),B(16)
0004                      DOUBLE PRECISION DABS, DSIN, DCOS, DSQRT
0005                      COMMON A, PHI, C, TRANS, DT
                  C       CONVERSION FACTORS
0006                      FTM=0.3048006
                  C       CONVERSION FROM FEET TO METERS
0007                      RTD=1.0/1.745329E-2
                  C       CONVERSION FROM RADIANS TO DEGREES
0008                      RTM=1.0/2.908882E-4
                  C       CONVERSION FROM RADIANS TO MINUTES
0009                      RTS=1.0/4.848137E-6
                  C       CONVERSION FROM RADIANS TO SECONDS
0010                      CMTNM=5.3996E-4
                  C       CONVERSION FROM METERS TO NAUTICAL MILES
0011                      CMSTK=1.0/5.144444E-1
0012                      XLAM =2.9979/4.0000
                  C       CONVERSION FROM METERS PER SECOND TO KNOTS
                  C       NOMINAL RADIUS OF THE EARTH IN FEET
0013                      RO=20.925747E6
0014                      E=1.0/298.3
0015                      THET=32.0/RTD
0016                      RELP=RO*(1.0-E*SIN(THET)*SIN(THET))
0017                      ALTNOM=20.0E3
0018                      R=RELP+ALTNOM
                  C       COMPUTATION OF MASS ATTRACTION ACCELERATION
0019                      GME = 1.407654E16
0020                      AJ=0.10823E-2
0021                      GM=GME/R*(1.0+1.5*AJ*RO*RO/R*(1.0-3.0*SIN(THET)*SIN(THET)))/R
0022                      R=R+FTM
0023                      GM=GM*FTM
0024                      WO=SQRT(GM/R)
                  C       INITIALIZE ALL MATRICES TO ZERO
0025                      DO 5 I=1,16
0026                      XN(I) = 0.0D0
0027                      XO(I) = 0.0D0
0028                      DO 5 J=1,16
0029                      C(I,J)=0.0D0
0030                      TRANS(I,J)=0.0D0
0031                      DUM(I,J)=0.0D0
0032                      A(I,J)=0.000
0033                      PDT(I,J)=0.000
0034                      H(I,J)=0.000
0035                      PN(I,J)=0.000
0036             5        CONTINUE
                  C       INPUT INITIAL NONZERO TERMS OF C MATRIX
0037                      C(1,1)=(5.0/CMTNM/R)**2
0038                      C(2,2)=C(1,1)
```

INVENTOR
ROBERT G. BROWN

Dawson, Tilton, Fallon & Lungmus
ATTORNEYS

Fig-4B

```
FORTRAN IV G LEVEL 1, MOD 3              MAIN              DATE = 69147        17/52/17            PAGE 0002

0039            C(3,3)=C(1,1)
0040            C(4,4)=C(1,1)
0041            C(5,5)=(10.0/CMSTK/R/WD)**2
0042            C(6,6)=C(1,1)
0043            C(7,7)=C(5,5)
0044            C(8,8)=(200.0*FTM/R1)**2
0045            C(9,9)=(0.03/WO/RTS)**2
0046            C(10,10)=C(9,9)
0047            C(11,11)=C(9,9)
0048            C(12,12)=(20.0/RTS)**2
0049            C(13,13)=C(12,12)
0050            C(14,14)=C(12,12)
0051            C(15,15) =(0.5*FTM/R/WD)**2
0052            C(16,16)=500.0**2
        C       THIS FIRST READ STATEMENT IS FOR THE DIR. COS MATRIX
        C       INITIALIZATION. ONLY THE FIRST 9 CELLS AND THE MODE AND
        C       TNEW WILL BE SIGNIFICANT.
                ITAPE=8
0053            READ(ITAPE,10000,END=10001)MODE,TNEW,CXXP,CXYP,CXZP,CYXP,CYYP,
0054           1 CYZP,CZXP,CYZP,CZZP
0055      10000 FORMAT(I2,F8.3,2BE14.7,6D23.16,1X,F7.0)
        C       FORM NONZERO TERMS IN TRANSFORMATION MATRIX
0056            DO 10 I=1,8
0057         10 TRANS(I,I)=1.000
0058            TRANS(9,9)=CXXP
0059            TRANS(9,10)=CYXP
0060            TRANS(9,11)=CZXP
0061            TRANS(10,9)=CXYP
0062            TRANS(10,10)=CYYP
0063            TRANS(10,11)=CZYP
0064            TRANS(11,9)=CXZP
0065            TRANS(11,10)=CYZP
0066            TRANS(11,11)=CZZP
0067            TRANS(12,12)=CXXP
0068            TRANS(12,13)=CYXP
0069            TRANS(12,14)=CZXP
0070            TRANS(13,12)=CXYP
0071            TRANS(13,13)=CYYP
0072            TRANS(13,14)=CZYP
0073            TRANS(14,12)=CXZP
0074            TRANS(14,13)=CYZP
0075            TRANS(14,14)=CZZP
0076            TRANS(15,15)=1.0DC
0077            TRANS(16,16)=1.0D0
        C       COMPUTE INITIAL P MATRIX FROM TRANS*C*TRANSTRANSPOSE
0078            DO 12 I=1,16
0079            DO 12 J=1,16
0080            SUM=0.0D0
0081            DO 11 N=1,16
0082         11 SUM=SUM+TRANS(I,N)*C(N,J)
0083         12 DUM(I,J)=SUM
0084            DO 14 I=1,16
0085            DO 14 J=1,16
```

INVENTOR
ROBERT G. BROWN
Dawson, Tilton, Fallon, & Lungmus
ATTORNEYS

Fig-4C

```
FORTRAN IV G LEVEL 1, MOD 3           MAIN              DATE = 69147         17/52/17         PAGE 0003

0086            SUM=0.000
0087            DO 13 N=1,16
0088     13     SUM=SUM+DUM(I,N)*TRANS(J,N)
0089     14     PO(I,J)=SUM
         C      SYMMETRIZE PO MATRIX
0090            DO 20 I=1,16
0091            DO 20 J=1,16
0092            PO(I,J)=(PO(I,J)+PO(J,I))/2.000
0093            PO(J,I)=PO(I,J)
0094            IF(DABS(PO(J,I))-1.0D-25) 18,18,20
0095     18     PO(J,I)=0.000
0096     20     DUM(I,J)=0.000
         C      COMPUTE CONSTANT TERMS FOR A MATRIX
         C      BETAS ARE IN UNITS OF PER SECOND
0097            B8=.18
0098            B9=1./1.5/3600.
0099            B10=B9
0100            B11=B9
0101            B12=1./3600.
0102            B13=B12
0103            B14=B12
0104            B16=1.0E-6
0105            A(9,9)=-B9
0106            A(10,10)=-B10
0107            A(11,11)=-B11
0108            A(12,12)=-B12
0109            A(13,13)=-B13
0110            A(14,14)=-B14
0111            A(15,15)=-B8
0112            A(16,16)=-B16
0113            A(4,5)=W0
0114            A(6,7)=W0
0115            A(8,15)=W0
         C      ENTER VARIANCES FOR H MATRIX
0116            V9=(.03/RTS/W0)**2
0117            V10=V9
0118            V11=V9
0119            V12=20./RTS*20./RTS
0120            V13=V12
0121            V14=V12
0122            V15=(.5*FTMXR/W0)**2
0123            V8=V15
0124            V16=250000.
0125            TOLD=TNEW
         C      ENTER DATA FROM PREPROCESSING PROGRAM
0126            DO 160 K=1,45
0127            READ(ITAPE,10000,END=10001)MODE,TNEW,CXXP,CXYP,CXZP,CYYP,CYYP,
               1CYZP,CZZP,CZYP,CZZP,WX,WY,WZ,W2X,W2Y,W2Z,WX4Y,WYWZ,
               2W2WX,WXRO,WYRO,NZRO,DWX,DWY,DWZ,DWXR,DWYR,DWZR,DR,
               3GCLAT,GLONG,ALT,XS,YS,ZS,COUNTR
0128     167    IF (K-8) 168, 170, 168
0129     169    IF (K-26) 169, 170, 169
0130     169    IF (K-32) 171, 170, 171
```

```
FORTRAN IV G LEVEL 1, MOD 3                MAIN           DATE = 69147         17/52/17          PAGE 0004

0131         170 COUNTR = 0.0
0132         171 CONTINUE
0133             DT=TNEW-TOLD
             C   COMPUTE THE NONZERO TERMS OF THE H MATRIX
             C   COVARIANCE MATRIX OF STATE RESPONSES DUE TO UNCORRELATED WHITE NOISE INPUT
0134             H(8,8)=WR*WO**2.0*VB/B8*(DT-2.0/B8*(1.0-EXP(-B8*DT))
                 1+0.5/B8*(1.0-EXP(-2.0*R8*DT)))
0135             H(15,15)=V15*(1.0-EXP(-2.0*B8*DT))
0136             H(8,15)=2.0*WO*V15*((1.0-EXP(-B8*DT))/B8
                 1-(1.0-EXP(-2.0*B8*DT))/2.0/B8)
0137             H(15,8)=H(8,15)
0138             H(9,9)=V9*(1.0-EXP(-2.0*B9*DT))
0139             H(10,10)=H(9,9)
0140             H(11,11)=H(9,9)
0141             H(12,12)=V12*(1.0-EXP(-2.0*B12*DT))
0142             H(13,13)=V13*(1.0-EXP(-2.0*B13*DT))
0143             H(14,14)=V14*(1.0-EXP(-2.0*B14*DT))
0144             H(16,16)=V16*(1.0-EXP(-2.0*B16*DT))
             C   COMPUTE TIME VARYING TERMS OF A MATRIX
0145             A(1,2)=WZ
0146             A(1,3)=-WY
0147             A(1,9)=-WO*CXXP
0148             A(1,10)=WO*CXYP
0149             A(1,11)=WO*CXZP
0150             A(2,1)=-WZ
0151             A(2,3)=WX
0152             A(2,9)=WO*CYXP
0153             A(2,10)=-WO*CYYP
0154             A(2,11)=WO*CYZP
0155             A(3,1)=WY
0156             A(3,2)=-WX
0157             A(3,9)=WO*CZXP
0158             A(3,10)=WO*CZYP
0159             A(3,11)=-WO*CZZP
0160             A(5,1)=(-DVZ/DT/R+W2X+W2Y-WO*WO)/WO
0161             A(5,3)=((WYRD+DWYR/DT)/R-WXWY)/WO
0162             A(5,4)=(-DVZ/DT/R-W2X-WO*WO+W2Z)/WO
0163             A(5,5)=-2.*DR/DT/R
0164             A(5,6)=((WZRD+DWZR/DT)/R-WXWY)/WO
0165             A(5,7)=-2.0*WY
0166             A(5,8)=(WYWZ-DWX/DT)/WO
0167             A(5,12)=WO*CYXP
0168             A(5,13)=WO*CYYP
0169             A(5,14)=WO*CYZP
0170             A(5,15)=-2.0*WX
0171             A(7,2)=A(5,1)
0172             A(7,3)=-2.0*WZ
0173             A(7,4)=A(5,6)+2.0*WXWY)/WO
0174             A(7,5)=-2.0*WZ
0175             A(7,6)=(-DVZ/DT/R+W2Y+W2Z-WO*WO)/WO
0176             A(7,7)=-A(5,5)
0177             A(7,8)=(-DWY/DT-WZWX)/WO
0178             A(7,12)=A(1,9)
```

Fig-4D

INVENTOR
ROBERT G. BROWN
Dawson, Tilton, Fallon & Lungmus
ATTORNEYS

```
FORTRAN IV G LEVEL 1, MOD 3         MAIN          DATE = 69147    17/52/17           PAGE 0005

0179              A(7,13)=A(1,10)
0180              A(7,14)=A(1,11)
0181              A(7,15)=A(5,7)
0182        C     COMPUTE PHI MATRIX USING MTEXP SUBROUTINE
                  CALL MTEXP
0183        C     COMPUTE APRIORI COVARIANCE MATRIX
0184              PHI(15,15)=EXPI-B0*DT)
0185              IF (K-1) 240,250,240
0186          250 WRITE(3,1555)(PHI(I,1),I=1,16)
0187          240 CONTINUE
0188              DO 22 I=1,8
0189              DO 22 J=1,16
0190              SUM=0.0D0
0191           21 N=1,16
0192           21 SUM=SUM+PHI(I,N)*PO(N,J)
0193           22 DUM(I,J)=SUM
0194              DO 24 I=1,16
0195              DUM(9,I)=PHI(9,9)*PO(9,I)
0196              DUM(10,I)=PHI(10,10)*PO(10,I)
0197              DUM(11,I)=PHI(11,11)*PO(11,I)
0198              DUM(12,I)=PHI(12,12)*PO(12,I)
0199              DUM(13,I)=PHI(13,13)*PO(13,I)
0200              DUM(14,I)=PHI(14,14)*PO(14,I)
0201              DUM(15,I)=PHI(15,15)*PO(15,I)
0202              DUM(16,I)=PHI(16,16)*PO(16,I)
0203           24 DO 26 I=1,16
0204              DO 26 J=1,8
0205              SUM=0.0D0
0206           25 DO 25 N=1,16
0207           25 SUM=SUM+DUM(I,N)*PHI(J,N)
0208           26 PN(I,J)=SUM
0209              DO 28 I=1,16
0210              PN(I,9)=DUM(I,9)*PHI(9,9)
0211              PN(I,10)=DUM(I,10)*PHI(10,10)
0212              PN(I,11)=DUM(I,11)*PHI(11,11)
0213              PN(I,12)=DUM(I,12)*PHI(12,12)
0214              PN(I,13)=DUM(I,13)*PHI(13,13)
0215              PN(I,14)=DUM(I,14)*PHI(14,14)
0216              PN(I,15)=DUM(I,15)*PHI(15,15)
0217           28 PN(I,16)=DUM(I,16)*PHI(16,16)
0218              DO 29 I=1,16
0219              DO 29 J=1,16
0220           29 PN(I,J)=PN(I,J)+H(I,J)
0221              DO 32 I=1,16
0222              DO 32 J=1,16
0223              PN(I,J)=(PN(I,J)+PN(J,I))/2.0D0
0224              PN(J,I)=PN(I,J)
0225              IF(DABS(PN(J,I))-1.0D-25) 30,30,32
0226           30 PN(J,I)=0.0D0
0227           32 CONTINUE
0228        C     COMPUTE APRIORI ESTIMATE OF X
                  DO 39 I=1,8
                  SUM=0.0D0
```

```
FORTRAN IV G LEVEL 1, MOD 3                MAIN                DATE = 69147        17/52/17                    PAGE 0008

0300            98 PO(I,J)=PN(I,J)
0301               WRITE(3,15555)(XN(I),I=1,16)
0302               WRITE(3,15555)(PN(I,I),I=1,16)
0303               TOLD=TNEW
               C   COMPUTATION OF STANDARD DEVIATION OF ESTIMATES AND INVERSE SCALING
0304               DPSIX=DSQRT(PN(1,1))*RTS
0305               DPSIY=DSQRT(PN(2,2))*RTS
0306               DPSIZ=DSQRT(PN(3,3))*RTS
0307               DPOSX=DSQRT(PN(4,4))*R*CMTNM
0308               DVELX=DSQRT(PN(5,5))*WO*R*CMSTK
0309               DPOSY=DSQRT(PN(6,6))*R*CMTNM
0310               DVELY=DSQRT(PN(7,7))*WO*R*CMSTK
0311               DPOSZ=DSQRT(PN(8,8))*R*CMTNM
0312               DVELZ=DSQRT(PN(15,15))*WO*R*CMSTK
0313               DGYDXP=DSQRT(PN(9,9))*WO*RTS
0314               DGYDZP=DSQRT(PN(10,10))*WO*RTS
0315               DGYDZP=DSQRT(PN(11,11))*WO*RTS
0316               DACCLX=DSQRT(PN(12,12))*WO*WO*R/GM
0317               DACCLY=DSQRT(PN(13,13))*WO*WO*R/GM
0318               DACCLZ=DSQRT(PN(14,14))*WO*WO*R/GM
0319               DCOUNT=DSQRT(PN(16,16))
               C   SCALING OF ESTIMATES
0320               PSIX=XN(1)*RTS
0321               PSIY=XN(2)*RTS
0322               PSIZ=XN(3)*RTS
0323               POSX=XN(4)*R*CMTNM
0324               VELX=XN(5)*WO*R*CMSTK
0325               POSY=XN(6)*R*CMTNM
0326               VELY=XN(7)*WO*R*CMSTK
0327               POSZ=XN(8)*R*CMTNM
0328               VELZ=XN(15)*WO*R*CMSTK
0329               GYDXP=XN(9)*WO*RTS
0330               GYDYP=XN(10)*WO*RTS
0331               GYDZP=XN(11)*WO*RTS
0332               ACCLX=XN(12)*WO*WO*R/GM
0333               ACCLY=XN(13)*WO*WO*R/GM
0334               ACCLZ=XN(14)*WO*WO*R/GM
0335               COUNT=XN(16)
0336               TN=DSIN(GCLAT)/DCOS(GCLAT)
0337               PX=XN(1)+XN(4)
0338               PY=XN(2)+XN(6)
0339               PZ=XN(3)+XN(4)*TN
0340               VPX= DSQRT(PN(1,1)+2.*PN(1,4)+PN(4,4))
0341              .VPY= DSQRT(PN(2,2)+2.*PN(2,6)+PN(6,6))
0342               VPZ= DSQRT(PN(3,3)+2.*PN(3,4)+TN*PN(4,4)+TN*TN)
0343               GCLAT=GCLAT*RTD
0344               GLONG=GLONG*RTD
0345               WRITE(3,140)
0346               WRITE(3,150) POSX,DPOSX,VELX,DVELX,PSIX,DPSIX,GYDXP,DGYDXP,ACCLX,
                  1DACCLX,POSY,DPOSY,VELY,DVELY,PSIY,DPSIY,GYDYP,DGYDYP,ACCLY,DACCLY,
                  2POSZ,DPOSZ,VELZ,DVELZ,PSIZ,DPSIZ,GYDZP,DGYDZP,ACCLZ,DACCLZ,
                  3TNEW,COUNT,DCOUNT,MODE,GCLAT,GLONG
0347               WRITE(3,15556) COUNT,DCOUNT,PX,VPX,PY,VPY,PZ,VPZ
```

INVENTOR
ROBERT G. BROWN
Dawson, Tilton, Fallon & Lungmus
ATTORNEY

```
FORTRAN IV G LEVEL 1, MOD 3          MAIN              DATE = 69147     17/52/17              PAGE 0009

0348        15555 FORMAT (1X,8D14.6/1X,8D14.6)
0349        15556 FORMAT (1X,8F14.6/1X,8E14.6)
0350        15557 FORMAT (1X,D14.6)
0351        15558 FORMAT (1X,E14.6)
0352          140 FORMAT(' POS ER(NM)',2X,'POS SD(NM)',2X,'VEL ER(KN)',2X,
                  1'VEL SD(KN)',2X,'PSI ER(SC)',2X,'PSI SD(SC)',2X,'GYR FR(SC)',2X,
                  2'GYR SD(SC)',2X,'ACC ER(GS)',2X,'ACC SD(GS)')
0353          150 FORMAT(3(1X,10(E11.4,1X)/),' TIME=',F12.3,6X,'DOPPLR COUNT=',F9.0,
                  110X,'MODE=',I2,6X,'VEHC LAT=',F10.6,10X,'VEHC LONG=',F14.6)
0354          160 CONTINUE
0355        10001 STOP
0356              END
```

Fig-41

INVENTOR
ROBERT G. BROWN
Dawson, Tilton, Fallon & Lungmus
ATTORNEYS

Fig-4G

```
FORTRAN IV G LEVEL 1, MOD 3              MAIN              DATE = 69147     17/52/17          PAGE 0007

0263            WRITE(3,1557) T2
0264            WRITE(3,1557) T3
          C     N=PO*PHI*MT  MT IS THE TRANSPOSE OF M*PHI*PO*NT AND BOTH ARE SCALERS
0265            IF (MODF) 47,48,49
          C     LOWER FREQ MEASUREMENT
0266       47   V=36.
0267            GO TO 50
          C     BOTH FREQ MEASUREMENT
0268       48   V=4.
0269            GO TO 50
          C     UPPER FREQ MEASUREMENT
0270            V=2500.0
0271       49   CONTINUE
0272            Q=T1+T2+T3+V
0273            WRITE(3,1557) Q
          C     THE PRODUCT PHI*PQ HAS COMPUTED AS DUM IN GENERATING PN
0274            DO 55 I=1,16
0275       55   R(I)=(PN(I,4)*BN+PN(I,6)*CN+PN(I,8)*RAN+PN(I,16)
               1-DUM(I,4)*BO-DUM(I,6)*CO-DUM(I,8)*RAO)/Q
          C     COMPUTATION OF A POSTERIORI STATE VECTOR
          C     COMPUTED COUNT
0276            COUNTC=6.24F5+(RHO-RHOOLD)/XLAM
          C     DIFFERENCE IN COMPUTED AND RECEIVED COUNT
0277            YN=COUNTC-COUNTR
          C     COMPUTE PROJECTED Y
0278            YP=BN*XN(4)+CN*XN(6)+RAN*XN(8)+XN(16)
               1-BO*XO(4)-CO*XO(6)-RAO*XO(8)
0279            WRITE(3,15555) YP,YN
          C     UPDATE XN
0280            DO 50 I=1,16
0281            WRITE(3,15555) R(I)
0282       60   XN(I)=XN(I)+R(I)*(YN-YP)
          C     COMPUTE A POSTERIORI P MATRIX
0283            DO 65 I=1,16
0284            DO 65 J=1,16
0285       65   PN(I,J)=PN(I,J)-Q*B(I)*B(J)
          C     SYMMETRIZE PN MATRIX
0286            DO 69 I=1,16
0287            DO 69 J=1,16
0288            PN(J,I)=(PN(I,J)+PN(J,I))/2.0
0289            IF(DABS(PN(J,I))-1.00-25) 68,68,69
0290       68   PN(I,J)=0.0
0291       69   CONTINUE
          C     RETAIN OLD VALUES OF ABC, RHO, X, P, AND TIME
0292       90   AO=AN
0293            BO=BN
0294            CO=CN
0295            RHOOLD=RHO
0296            DO 98 I=1,16
0297            XO(I)=XN(I)
0298       98   J=1,16
```

INVENTOR
ROBERT G. BROWN

Dawson, Tilton, Fallon & Lungmus
ATTORNEYS

Fig-4F

```
FORTRAN IV G LEVEL 1, MOD 3                    MAIN                 DATE = 69147      17/52/17           PAGE 0006

0229            DO 37 J=1,16
0230         37 SUM =SUM+PHI(I,J)*XO(J)
0231            XN(I)=SUM
0232            DO 38 I=9,16
0233         38 XN(I)=PHI(I,I)*XO(I)
                DETERMINE IF SATELLITE DATA IS AVAILABLE
0234            IF(MODE-2) 40,95,95
0235         40 CONTINUE
      C         COMPUTE THE 9 DIRECTION COSINES RELATING EARTH FIXED XYZ
      C         COORDINATE SYSTEM TO NAVIGATION  XYZ FOR THE SIGN III SYSTEM
0236            CXXC=-DSIN(GCLAT)*DCOS(GLONG)
0237            CXYC=-DSIN(GCLAT)*DSIN(GLONG)
0238            CXZC=DCOS(GCLAT)
0239            CYXC=-DSIN(GLONG)
0240            CYYC=-DCOS(GLONG)
0241            CYZC=0.0D0
0242            CZXC=DCOS(GCLAT)*DCOS(GLONG)
0243            CZYC=DCOS(GCLAT)*DSIN(GLONG)
0244            CZZC=DSIN(GCLAT)
      C         COMPUTE RADIUS VECTOR FROM CENTER OF EARTH TO SATELLITE
0245            RS=DSQRT(XS*XS+YS*YS+ZS*ZS)
      C         COMPUTE DIRECTION COSINES BETWEEN VEHICLE AND SATELLITE
0246            CXZS=(XS*CXXC+YS*CXYC+ZS*CXZC)/RS
0247            CYZS=(XS*CYXC+YS*CYYC+ZS*CYZC)/RS
0248            CZZS=(XS*CZXC+YS*CZYC+ZS*CZZC)/RS
      C         COMPUTE RADIUS FROM CENTER OF EARTH TO INERTIAL SYSTEM
0249            RCOM=RO*(1.0-E*DSIN(GCLAT)*DSIN(GCLAT))
0250            RCOM=RCOM+FTM+ALT
0251            RHO=DSQRT(RCOM*RCOM+RS*RS-2.0*RCOM*RS*CZZS)
      C         COMPUTE THE ABC VALUES FOR MEASUREMENT EQUATIONS
0252            AN=(RCOM-RS*CZZS)/RHO/XLAM
0253            BN=(RCOM*RS*CYZS)/RHO/XLAM
0254            CN=-(RCOM*RS*CXZS)/RHO/XLAM
      C         DETERMINE IF DOPPLER COUNT IS AVAILABLE
0255            IF(COUNTR) 90,90,45
0256         45 CONTINUE
      C         FORM Q
      C         M*PN*MT IS A SCALER T1
0257            RAN=R*AN
0258            T1=BN*(BN*PN(4,4)+CN*PN(4,6)+RAN*PN(4,8)+RAN*PN(4,16))
     1         +CN*(BN*PN(6,4)+CN*PN(6,6)+RAN*PN(6,8)+RAN*PN(6,16))
     2         +RAN*(BN*PN(8,4)+CN*PN(8,6)+RAN*PN(8,8)+RAN*PN(8,16))
     3         +(BN*PN(16,4)+CN*PN(16,6)+RAN*PN(16,8)+RAN*PN(16,16))
      C         N*PO*NT IS A SCALER T2
0259            RAQ=R*AQ
0260            T2=RO*(BO*PO(4,4)+CO*PO(4,6)+RAQ*PO(4,8))
     1         +CO*(BO*PO(6,4)+CO*PO(6,6)+RAQ*PO(6,8))
     2         +RAQ*(BO*PO(8,4)+CO*PO(8,6)+RAQ*PO(8,8))
      C         M*PHI*PO*NT IS A SCALER T3 PHI*PO HAS BEEN PREVIOUSLY STORED AS DUM
0261            T3=-BO*(BN*DUM(4,4)+CN*DUM(6,4)+RAN*DUM(8,4)+DUM(16,4))
     1         -CO*(BN*DUM(4,6)+CN*DUM(6,6)+RAN*DUM(8,6)+DUM(16,6))
     2         -RAQ*(BN*DUM(4,8)+CN*DUM(6,8)+RAN*DUM(8,8)+DUM(16,8))
0262            WRITE(3,1557) T1
```

INVENTOR
ROBERT G. BROWN
Dawson, Tilton, Fallon & Lungmus
ATTORNEYS

```
FORTRAN IV G LEVEL 1, MOD 3        MTEXP          DATE = 69147       17/52/17        PAGE 0001

0001            SUBROUTINE MTEXP
0002            DOUBLE PRECISION A(16,16),B(16,16),W(16,16),Y(16,16)
0003            DOUBLE PRECISION DABS
0004            COMMON A, B, W, Y, C
0005            IP=8
0006            MP=8
0007            N=16
0008            NT=8
0009            IP=IP+1
0010            DO 50 J=1,N
0011            DO 50 I=1,N
0012            A(I,J)=A(I,J)*C
0013            W(I,J)=A(I,J)
0014         50 Y(I,J)=0.0D0
0015            DO 53 J=1,N
0016            DO 53 I=1,N
0017            IF(I-J) 52,51,52
0018         51 B(I,J)=1.0D0
0019            GO TO 53
0020         52 B(I,J)=0.0D0
0021         53 CONTINUE
0022         75 KD=2.NT
0023            XD=0.0
0024            DO 54 J=1,N
0025            DO 54 I=1,N
0026         54 B(I,J)=B(I,J)+W(I,J)
0027            DO 56 J=1,IP
0028            DO 56 I=1,IP
0029            SUM=0.0
0030            DO 55 L=1,IP
0031         55 SUM=SUM+W(I,L)*A(L,J)
0032         56 Y(I,J)=SUM/XD
0033            DO 57 J=IIP,N
0034            DO 57 J=1,IP
0035         57 Y(I,J)=W(I,J)*A(J,J)/XD
0036            DO 62 I=IIP,N
0037            DO 62 J=1,IP
0038         62 Y(I,J)=W(I,J)*A(J,J)
0039            DO 59 J=1,N
0040            DO 59 L=1,IP
0041            SUM=0.0
0042            DO 60 L=1,IP
0043         60 SUM=SUM+W(I,L)*A(L,J)
0044         59 Y(I,J)=Y(I,J)+SUM/XD
0045            DO 58 J=1,N
0046            DO 58 I=1,N
0047         58 W(I,J)=Y(I,J)
0048            DO 80 I=1,N
0049            DO 80 J=1,N
0050            SCRW= DABS(W(I,J))-1.0D-25
0051        504 IF(SCRW) 504,504,80
0052            W(I,J)=0.0D0
0053         80 CONTINUE
                75 CONTINUE
```

```
FORTRAN IV G LEVEL 1, MOD 3        MTEXP        DATE = 69147    17/52/17    PAGE 0002

0054        DO 90 J=1,N
0055        DO 90 I=1,N
0056     90 A(I,J)=A(I,J)/C
0057        RETURN
0058        END
```

INVENTOR
ROBERT G. BROWN
Dawson, Tilton, Fallon & Lungmus
ATTORNEYS

INERTIAL/DOPPLER-SATELLITE NAVIGATION SYSTEM

BACKGROUND AND SUMMARY

The present invention relates to a navigation system having a cluster of inertial sensors which makes use of doppler frequency shift data from an earth-orbiting satellite to correct errors in the inertial sensors.

Details of the Navy Navigation Satellite System (NNSS) have recently been made public; and civilian use of the system is encouraged (see for example "The Navy Navigation Satellite System: Description and Status," T.A. Stansell, Institute of Navigation Proceedings; pp. 30–60 (1967). It is already public knowledge that the satellites included in the NNSS system transmit a sinusoidal signal of known and constant frequency as well as signals representative of the position coordinates of the satellite.

This has brought about renewed commercial interest in integrating inertial and satellite navigation systems. The match is a natural one because of complementary characteristics of the two systems. Inertial systems provide essentially continuous outputs but suffer from long-term drift (i.e. error). On the other hand, the NNSS system is capable of providing excellent discrete position fixes; but it cannot by itself, provide the necessary interpolation between these fixes. Thus, the integration of these systems to use the advantages of each is highly desirous.

In addition to the complementary features just mentioned, there is a more subtle reason for considering the combined inertial-satellite system. The accuracy of a position fix (that is, the three-dimensional coordinates that fix a body in space) obtained from the doppler shift of the satellite signal is dependent on knowledge of the vehicle velocity, and the accuracy of a given position fix will be enhanced if it is based on very accurate velocity information. The need for highly accurate velocity information is especially critical in a high-speed aircraft in a maneuvering situation where an inertial system might be the only possible means of obtaining instantaneous velocity accurately enough for a good position fix.

Heretofore, two general approaches have been suggested to incorporate the two systems together in such a way as to take advantage of the desirable characteristics of each.

A first approach uses the navigation satellite system in the conventional manner as described in an article by R. B. Kershner and R. R. Newton entitled "The Transit System," *Institute of Navigation Journal*, 15: 129–144 (1962) to obtain a position fix with the inertial system providing velocity reference information for compensation in the position-fix determination. The position output of the inertial system is then reset in accordance with the best estimate of position by extrapolating the position fix to the appropriate point in real time.

A second system was described in an article by B. E. Bona and C. E. Hutchinson entitled "Optimum Reset of an Inertial Navigator from Satellite Observations," *National Electronic Conference Proceedings*, 21: 569–574, (1965). This system suggests using the above-described procedure except that the position fix is fed into the inertial system via a Kalman filter to provide estimates of some of the inertial system's error forcing functions, such as gyro biases, as well as position errors in the inertial system. As a result, the inertial system can be reset more accurately; and the rate of error propagation after the reset will be less than that which would occur subsequent to a simple position reset. This improved performance is achieved at the cost of additional computer capacity to implement the program to carry out the Kalman filter technique.

The present invention uses the satellite doppler data to directly augment the inertial system and thereby obviates the intermediate step of computing a position fix. A linear model is developed for the propagation of error in the pure inertial system; and then a linear relation between the states of the error model and the measures of these states provided by external augmenting sources is used to generate estimates of these errors. The basic observable (i.e. external reference source) is the doppler frequency shift of the signal transmitted by the satellite as received by the vehicle. Given the orbital parameters defining the position of the satellite, the inertial system computes the frequency it "thinks" it should receive based on its own computation of position and velocity and the satellite's orbital parameters as received from the satellite. The actual and computed frequency shifts are then compared; and a resultant difference frequency is obtained. This difference frequency is then related to the states in the inertial-system error model via the equation $$\delta f_D = a_1 \delta\theta_x + a_2 \delta\dot\theta_x + a_3 \delta\theta_y + a_4 \delta\dot\theta_y + \text{noise} \quad (1)$$

where
  $\delta f_D$ = computed frequency - actual frequency received
  $\delta\theta_x, \delta\theta_y$ = inertial system position errors
  $\delta\dot\theta_x, \delta\dot\theta_y$ = inertial system velocity errors
  $a_1, a_2, a_3, a_4$ = time varying coefficients that depend on vehicle position and satellite parameters. These are computable on a real-time basis.

First-order perturbations are used to obtain the linear form of Equation 1.

Thus, the two basic requirements for a real-time, closed-loop Kalman-filter operation are fulfilled — there is a linear model for the random process to be estimated (i.e., the propagation of inertial system errors); and a linear relationship is defined in (Eq. 1) between the random processes being estimated and on external, measurable, observable parameter.

It should be noted that the inertial velocity and instrument bias errors may be corrected, as well as the position errors, with the inventive system. The inventive system represents an improvement over the other described methods because it accounts for the various sources of error in both the inertial and the augmenting system in a way that makes effective use of the Kalman-filter reset technique. The improvement over the first method is apparent because in that method no attempt is made to reset any errors in the inertial system except the position errors. The second system has a severe limitation in that the correlation between the inertial velocity error and the satellite position-fix error is not properly accounted for; and the resulting accuracy is degraded. The inventive system does account for this correlation, and, as a result, provides improved performance over either of the known methods.

THE DRAWING

FIG. 3 is a diagrammatic illustration defining the coordinate system used in the disclosure;

FIGS. 4A–4K illustrate a computer program for implementing computations according to the present invention using Doppler counts as the observable.

DETAILED DESCRIPTION

Before proceeding with the detailed description, discussion of the doppler measurement and Kalman filter are in order. Frequency cannot be sampled at an instant in time, so some form of averaging over a finite time period must be used to form the $\delta f_D$ term in Equation (1). A convenient way of implementing a frequency measurement electronically is to count the number or cycles over a known time interval. When properly scaled, the count becomes a measure of the average for the interval. If the time interval is relatively short and the frequency does not vary appreciably during the interval, the resultant average frequency approximates a discrete frequency sample at a point in time; and Equation (1) applies directly as the "measurement" relationship (or input) in a discrete Kalman filter. However, if the counting operation takes place over a relatively long interval of time, the "average frequency" may not be an acceptable approximation of a discrete frequency sample; and an alternate measurement equation in which the frequency count is treated as the observable is preferred. Therefore, two alternative examples will be fully discussed below: in the first, discrete samples of frequency are considered as the measurement, and the latter frequency count is treated as the measurement.

KALMAN FILTER EQUATIONS

The Kalman filter is a recursive data processing technique wherein least-squares estimates of the states of a random process are obtained at discrete points in time. The basic recursive equations are as follows:

$$b_n = P_n^* M_n^T (M_n P_n^* M_n^T + V_n)^{-1} \quad \text{(K-1)}$$

$$P_n = P_n^* - b_n(M_n P_n^* M_n^T + V_n)b_n^T \quad \text{(K-2)}$$

$$\hat{x}_n = \hat{x}_n' + b_n(y_n - \hat{y}_n') \quad \text{(K-3)}$$

$$\hat{x}'_{n+1} = \phi_n \hat{x}_n \quad \text{(K-4)}$$

$$P_n^* = \phi_{n-1} P_{n-1} \phi^T{}_{n-1} + H_{n-1} \quad \text{(K-5)}$$

where $\Delta_t$ = time increment between $t_n$ and $t_{n+1}$ $\phi_n$ = transition matrix $x_n$ = true state at time $t_n$ $\hat{x}_n$ = optimum estimate of $x$ after using all of the measured data through $y_n$ $\hat{x}_n'$ = optimum estimate of $x$ after using all of the measured data through $y_{n-1}$ $b_n$ = gain matrix $y_n$ = measurement at time $t_n$ $\hat{y}_n' = M_n \hat{x}_n'$ $P_n^*$ = covariance matrix of the estimation error ($\hat{x}_n' - x_n$) o* and $P_n$ = covariance matrix of the estimation error ($\hat{x}_n - x_n$)

$M_n$ = measurement matrix $V_n$ = covariance matrix of the measurement error by $\delta y_n$ $H_n$ = covariance matrix of the response of the states to all white noise driving functions.

The process is started by choosing an initial $P_0^*$ AND $\hat{x}_0'$. Once these are chosen, the recursive equations uniquely specify a solution for any subsequent time, $t_n$. For further information, see for example H. W. Sorenson, "Kalman Filtering Techniques," in C. T. Leondes, ed., Advances In Control Systems, vol. 3, Academic Press, 1966.

FUNCTIONAL BLOCK DIAGRAM

Figure 1:
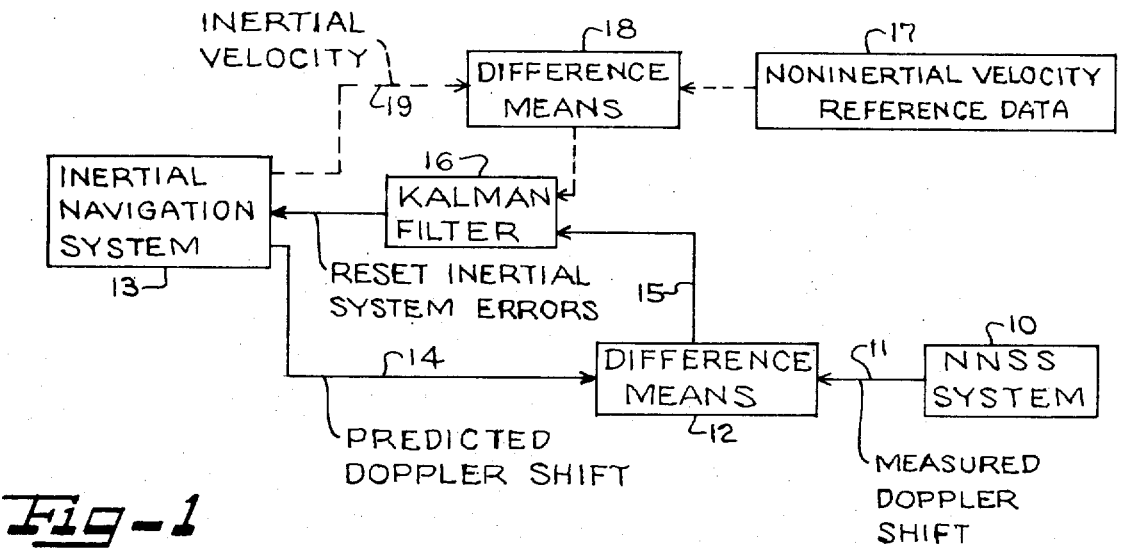
FIG. 1 is a tutorial schematic block diagram descriptive of the inventive system.

FIG. 1 is referred to in order to understand the overall functioning of the inventive system. Reference numeral 10 generally designates a doppler satellite system such as the previously-mentioned Navy Navigation Satellite System. The NNSS system is already in existence; and it includes an earth-orbiting satellite which transmits a constant, known sinusoidal wave of known frequency as well as signals representative of the position of the satellite. Reference is here made to the above article of Stansell. It will be appreciated that the signals transmitted from the satellite permit one to compute its position as a function of time.

The signal of known frequency is received at the vehicle under control and compared with the nominal frequency known to be the frequency of the signal at the satellite; and the difference is transmitted along a line 11 to the negative input of a summing junction 12. It will be appreciated that although the line 11 is shown for simplicity as a single line, it will in fact be a plurality of parallel lines, each carrying a separate digit of a composite digital word.

The vehicle also receives data from the satellite which is representative of its position; and the inertial navigation system schematically designated at 13, based upon its own estimate of its position and the received orbital data from the satellite, generates a signal representative of a predicted doppler shift that it should have received along the line 14 — that is, the predicted doppler shift signal is what the inertial navigation system "thinks" it should see based upon its estimate of its own position and the received orbital data from the satellite. Any errors in its own estimate of its position will result in errors in the predicted doppler shift transmitted along line or bus 14 to the positive terminal of the summing junction 12. The difference means 12 generates an output signal $\Delta f_D$, on a bus 15 representative of the difference between the measured doppler shift and the predicted doppler shift. This output signal is then transmitted to a Kalman filter (which is a program to be executed on a digital computer and schematically designated 16). The output of the Kalman filter is a set of signals representative of estimates of errors contained in the position and velocity information in the inertial navigation system; and these estimates are used to reset and correct the position and velocity information in the inertial navigation system. The instrument bias errors may also be corrected.

If it is available, noninertial velocity reference data from a source schematically designated 17 may be transmitted to the negative input of a second difference means 18; and information representative of the velocity of the inertial navigation system may be transmitted to the positive input of the difference means 18 along the dashed line 19. The output of the difference means 18 may also be fed into the Kalman filter, if desired.

Figure 2:
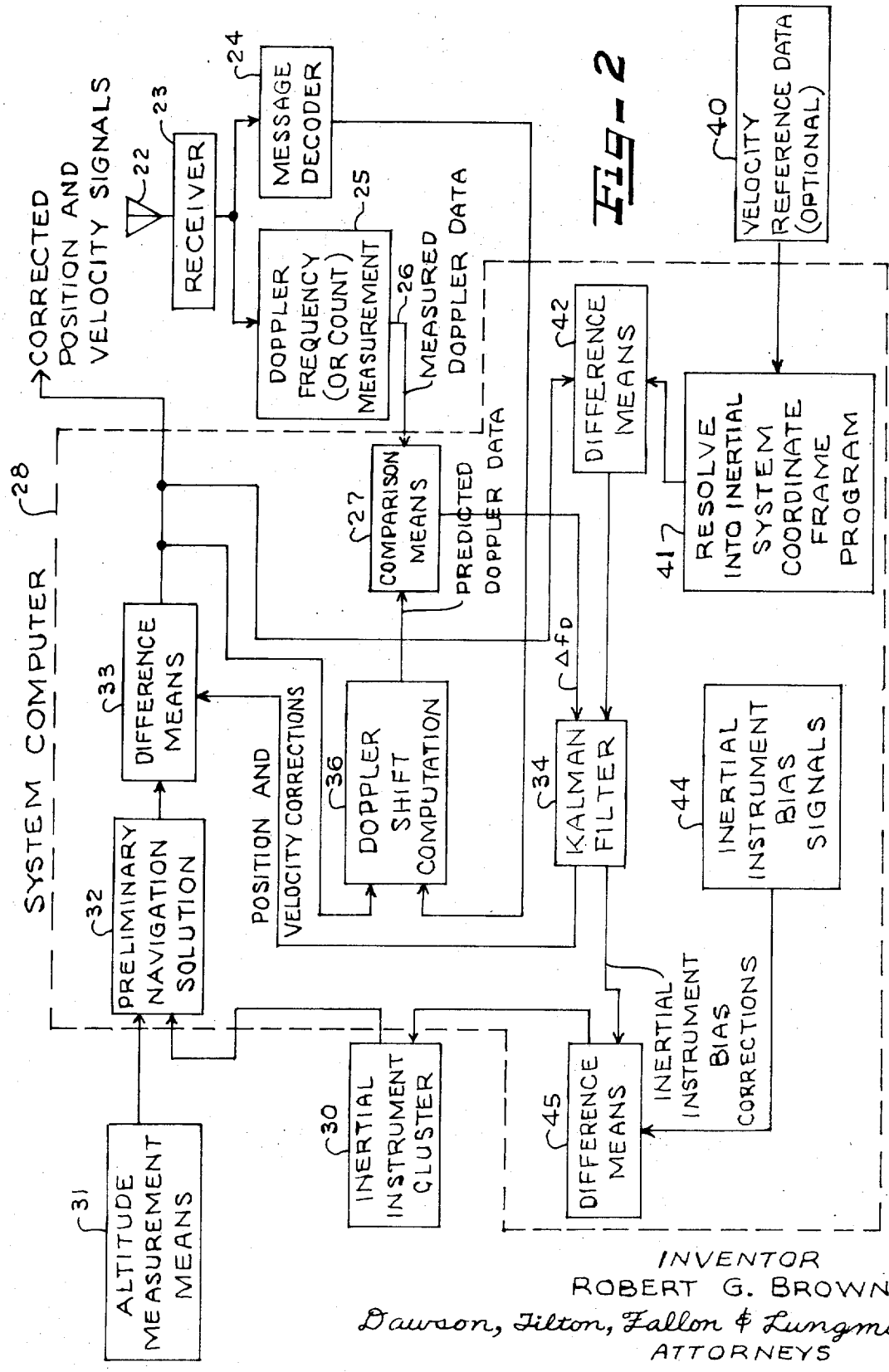
FIG. 2 is a more detailed schematic block diagram of the system of FIG. 1.

Turning now to FIG. 2, there is shown a more detailed schematic block diagram of the system on board the vehicle being controlled. The rf signal from the satellite is received at an antenna schematically designated at 22 and fed into a receiver 23 which, in turn, feeds a message decoder 24. The receiver also feeds a doppler frequency measurement means 25. The doppler frequency measurement means performs the function of comparing the received frequency with a known reference frequency source. For example, a local oscillator may be operating at the frequency close to that which the satellite is known to transmit (the nominal frequency) and the received frequency is mixed with the output of the local oscillator to generate a signal having a frequency representative of the difference in frequency between the received signal and the local oscillator. From this the "measured doppler data" is computed; and it is transmitted along a line 26 to the differencing means 27 (which corresponds to the earlier-described block 12). The dashed line 28 in FIG. 2 encompasses all of the functions that may be performed (and preferably are performed) in a system computer, having a capability similar to the IBM 360. Thus, there are transmitted to the computer 28, and in particular a differencing means 27 along line 26 a series of signals, each set being representative of a measured doppler shift (that is, measured with respect to the nominal transmitting frequency of the satellite). The message decoder 24 generates three sets of signals, representative of the position of the satellite and designated $X_s$, $Y_s$, and $Z_s$ respective at a sequence of known points in time. These latter signals are sometimes referred to collectively as the "orbital data" or orbital parameters received from the satellite.

An inertial instrument cluster schematically designated within the block 30 includes means for generating separate signals representative of acceleration of the inertial instrument platform in three orthogonal directions. Typically, the inertial instrument cluster might contain three separate gyroscopes; and associated with each gyroscope is an accelerometer — the acceleration signals ($a_x$, $a_y$, and $a_z$) being generated by the accelerometers. An altitude measurement means 31 may also be included, for example, if the vehicle is an aircraft; and the altitude measurement means 31 generates a signal representative of altitude. The outputs of the inertial instrument cluster 30 and the altitude measurement means 31 are fed into the system computer 28; and a program generates a preliminary navigation solution as schematically designated at 32 from these inputs. The output information contained in the preliminary navigation solution includes the three orthogonal components of position and velocity; and these signals are corrected at 33 according to the estimates of errors computed by a Kalman filter 34 and subtracted from or added to the pure inertial data to generate a corrected set of position and velocity outputs which are stored in separate registers within the computer 28.

The corrected position and velocity data is also used to compute a doppler shift computation, schematically represented at 36, to generate a signal representative of a predicted doppler shift that the vehicle "thinks" it should see, based upon the orbital data received from the message decoder 24, which is also taken into account in the doppler shift computation. The predicted doppler shift information is compared in the comparison means 27 with the actual measured doppler data to generate a signal representative of the difference between the measured doppler shift and the predicted doppler shift. This difference signal is $\Delta f_D$; and it is the basic "measurement" or observable fed into the Kalman filter 34.

If it is available, velocity reference data, schematically designated by reference numeral 40 may also be fed into the computer 28 and resolved into the inertial system coordinate frame by means of a program 41 to generate a set of signals representative of velocity reference information in the same coordinate frame as the inertial system. This information is then compared with the actual velocity information at 42 and also may be fed into the Kalman filter 34. The inertial instrument bias signals are stored, as schematically designated at 44 in the computer 28; and if it is desired, the Kalman filter 34 may generate a set of inertial instrument bias corrections to modify the inertial instrument bias signals from the computer memory as at 45 and then fed to correct the biases on the gyroscopes and accelerometers in the inertial instrument cluster 30.

Having thus described the system in somewhat functional terms in order to enhance an understaning thereof, mathematical models for the system will now be developed in greater detail. As previously mentioned, there are two alternative embodiments for the mathematical model for the Kalman filter, one being based on discrete samples of frequency as the basic measurement or observable, and the other being based on a frequency count as the measurement or observable upon which the Kalman filter operates.

EXAMPLE I

Discrete Samples of Frequency as the Measurement

Beginning with the inertial system error model, it is noted from Equation (1) that the "measurement" $\delta f_D$ is related to both the position and velocity errors of the inertial system. Thus, the Schuler (84-minute) dynamics must be included in the error model in order that the inertial velocity errors appear as states, as well as position errors. A second reason for including the Schuler dynamics is the desire to include the pure inertial case as well as the velocity-damped case. It is only in the velocity-damped situation that one can simplify the model to just the "$\Psi$-equations" as was done by Bona and Hutchinson, op. cit., 569–574; and even then, validity is questionable because of the coupling between the inertial velocity and position-fix errors. Furthermore, if periods of operation that are an appreciable fraction of 24 hours are considered, account must be taken of the coupling effect between channels of the inertial system. This is done by including the socalled "Ψ-equations" in the model (see G. R. Pitman, Jr., ed. *Inertial Guidance*, John Wiley and Sons, Inc. (1962). Thus, the error model for the inertial system must include both the Schuler and 24-hour dynamics.

To keep the analysis as simple as possible, but yet realistic, the technique for a slow-moving marine situation with the inertial system operating in a conventional latitude-longitude system will be illustrated. An error model for this case is as follows:

Ψ-EQUATIONS mented states are defined as follows: $x_8 = \epsilon_x$, $x_9 = \epsilon_y$, $x_{10} = \epsilon_z$, $x_{11} = -\Delta_y/R$, $x_{12} = \Delta_x/R$, $x_{13} = \delta v_x$, $x_{14} = \delta v_y$, $x_{15} = \delta f_1$, $x_{16} = \delta f_2$, and $x_{17} = \delta f_3$, where $\delta v$ and $\delta f$ refer to the Markov components of the velocity reference and satellite frequency errors. The resultant state equation for the system is shown in matrix form on the following page.

For a derivation of the Equations (2) – (6), see Brown and Friest "Optimization of Hybrid Inertial Solar-Tracker Navigation System," IEEE International Convention Record, vol. 7, pp. 121–135 (1964).

$$\begin{bmatrix} \dot{x}_1 \\ \dot{x}_2 \\ \dot{x}_3 \\ \dot{x}_4 \\ \dot{x}_5 \\ \dot{x}_6 \\ \dot{x}_7 \\ \dot{x}_8 \\ \dot{x}_9 \\ \dot{x}_{10} \\ \dot{x}_{11} \\ \dot{x}_{12} \\ \dot{x}_{13} \\ \dot{x}_{14} \\ \dot{x}_{15} \\ \dot{x}_{16} \\ \dot{x}_{17} \end{bmatrix} = \begin{bmatrix} 0 & \Omega_z & 0 & 0 & 0 & 0 & 0 & 1 & 0 & 0 & 0 & 0 & 0 & 0 & 0 & 0 & 0 \\ -\Omega_z & 0 & \Omega_x & 0 & 0 & 0 & 0 & 0 & 1 & 0 & 0 & 0 & 0 & 0 & 0 & 0 & 0 \\ 0 & -\Omega_x & 0 & 0 & 0 & 0 & 0 & 0 & 0 & 1 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 & 0 \\ \omega_0^2 & 0 & 0 & -\omega_0^2 & 0 & 0 & 2\Omega_z & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 & 0 \\ 0 & -\omega_0^2 & 0 & 0 & -2\Omega_z & -\omega_0^2 & 0 & 0 & 0 & 0 & 0 & 1 & 0 & 0 & 0 & 0 & 0 \\ 0 & 0 & 0 & 0 & 0 & 0 & 0 & -\beta_1 & 0 & 0 & 0 & 0 & 0 & 0 & 0 & 0 & 0 \\ 0 & 0 & 0 & 0 & 0 & 0 & 0 & 0 & -\beta_2 & 0 & 0 & 0 & 0 & 0 & 0 & 0 & 0 \\ 0 & 0 & 0 & 0 & 0 & 0 & 0 & 0 & 0 & -\beta_3 & 0 & 0 & 0 & 0 & 0 & 0 & 0 \\ 0 & 0 & 0 & 0 & 0 & 0 & 0 & 0 & 0 & 0 & -\beta_4 & 0 & 0 & 0 & 0 & 0 & 0 \\ 0 & 0 & 0 & 0 & 0 & 0 & 0 & 0 & 0 & 0 & 0 & -\beta_5 & 0 & 0 & 0 & 0 & 0 \\ 0 & 0 & 0 & 0 & 0 & 0 & 0 & 0 & 0 & 0 & 0 & 0 & -\beta_6 & 0 & 0 & 0 & 0 \\ 0 & 0 & 0 & 0 & 0 & 0 & 0 & 0 & 0 & 0 & 0 & 0 & 0 & -\beta_7 & 0 & 0 & 0 \\ 0 & 0 & 0 & 0 & 0 & 0 & 0 & 0 & 0 & 0 & 0 & 0 & 0 & 0 & -\beta_8 & 0 & 0 \\ 0 & 0 & 0 & 0 & 0 & 0 & 0 & 0 & 0 & 0 & 0 & 0 & 0 & 0 & 0 & -\beta_9 & 0 \\ 0 & 0 & 0 & 0 & 0 & 0 & 0 & 0 & 0 & 0 & 0 & 0 & 0 & 0 & 0 & 0 & -\beta_{10} \end{bmatrix} \begin{bmatrix} x_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \\ x_{16} \\ x_{17} \end{bmatrix} + \begin{bmatrix} 0 \\ 0 \\ 0 \\ 0 \\ 0 \\ 0 \\ 0 \\ f_1 \\ f_2 \\ f_3 \\ f_4 \\ f_5 \\ f_6 \\ f_7 \\ f_8 \\ f_9 \\ f_{10} \end{bmatrix} \quad (7)$$

$$\dot{\Psi}_x - \Omega_z \Psi_y = \epsilon_x \quad (2)$$

$$\dot{\Psi}_y + \Omega_z \Psi_x - \Omega_x \Psi_z = \epsilon_y \quad (3)$$

$$\dot{\Psi}_z + \Omega_x \Psi_y = \epsilon_z \quad (4)$$

SCHULER-LOOP EQUATIONS $$\delta\ddot{\theta}_x + \omega_0^2 \delta\theta_x + \omega_0^2 \Psi_x - 2\Omega_z \delta\dot{\theta}_y = -\Delta_y/R \quad (5)$$

$$\delta\ddot{\theta}_y + \omega_0^2 \delta\theta_y + \omega_0^2 \Psi_y + 2\Omega_z \delta\dot{\theta}_x = \Delta_x/R \quad (6)$$

where $x,y,z$ = nominal platform axis ($x$-north, $y$-west, $z$-up)
$\Psi_x, \Psi_y, \Psi_z$ = "telescope pointing errors" (see Pitman)
$\Omega_x, \Omega_y, \Omega_z$ = earth-rate components
$\delta\theta_x, \delta\theta_y$ = inertial system position errors Equation (7) fits the required format for a "Kalman-filter" estimation of the states.

The output equation describing the connection between the system and the measurements will now be explained. In addition to the discrete frequency-difference measurement discussed previously, the possibility of measuring the inertial velocity error states by comparing the inertial velocity with a noninertial velocity reference is admitted. The magnitudes of the terms in the associated measurement covariance matrix can be used to switch this observable "in or out," depending on the situation. Also, correlated components of error (assumed to be Markov) in each measurement are allowed. Thus the three measurements allowed in this model are described by the matrix equation on the following page.

$$\begin{bmatrix} y_1 \\ y_2 \\ y_3 \end{bmatrix} = \begin{bmatrix} 0 & 0 & 0 & a_1 & a_2 & a_3 & a_4 & 0 & 0 & 0 & 0 & 0 & 0 & 0 & \mu_1 & \mu_2 & \mu_3 \\ 0 & 0 & 0 & 0 & 1 & 0 & 0 & 0 & 0 & 0 & 0 & 0 & 1 & 0 & 0 & 0 & 0 \\ 0 & 0 & 0 & 0 & 0 & 0 & 1 & 0 & 0 & 0 & 0 & 0 & 0 & 1 & 0 & 0 & 0 \end{bmatrix} \begin{bmatrix} x_1 \\ x_2 \\ \vdots \\ x_{16} \\ x_{17} \end{bmatrix} + \begin{bmatrix} \delta y_1 \\ \delta y_2 \\ \delta y_3 \end{bmatrix} \quad (8)$$

$\epsilon_x, \epsilon_y, \epsilon_z$ = gyro drift rates
$\Delta_x, \Delta_y$ = accelerometer errors We now note that Equations 2 through 6 may be written as a set of seven first-order equations by defining states as follows: $x_1 = \Psi_x$, $x_2 = \Psi_y$, $x_3 = \Psi_z$, $x_4 = \delta\theta_x$, $x_5 = \delta\dot{\theta}_x$, $x_6 = \delta\theta_y$, $x_7 = \delta\dot{\theta}_y$. Furthermore, if the driving function $\epsilon_x$, $\epsilon_y$, $\epsilon_z$, $\Delta_y$, and $\Delta_x$ are assumed to be Markov processes (with random walk as a special case), they will also satisfy first-order differential equations of the form $\dot{x} + \beta x$ = white noise. This gives rise to five additional states that are sometimes referred to as "augmented" states. Also, the presence of a noninertial velocity reference with Markov errors in both x and y channels are accounted for, so two more augmented states must be added; but these states are required only if a noninertial velocity reference is available to augment the inertial system. Finally, if there are three satellites, each with independent Markov errors in frequency, then there are three more augmented states to add to the system. Thus, in this example, 10 augwhere $y_1$ = computed frequency — received frequency
$y_3$ = reference velocity — inertial velocity ($x$ and $y$ channels respectively)
$a_1, a_2, a_3, a_4$ = time varying coefficients that depend on satellite geometry (to be discussed in following section)
$\mu_1, \mu_2, \mu_3$ = zero or unity depending on which of three satellites is being received
$\delta y_1, \delta y_2, \delta y_3$ = uncorrelated components of measurement errors.

The model is now complete except for the detailed description of the $a_1$, $a_2$, $a_3$, $a_4$ coefficients in the output matrix. This will be discussed next.

B. COMPUTATION OF THE TIME-VARYING TERMS OF THE OUTPUT MATRIX

The explicit relationship between $\delta f_D$ (as defined in Equation 1) and the position and velocity errors of the inertial system will now be derived. Considering only small perturbations from the ideal error-free situation, and referring to FIG. 3 which illustrates the various geometrical parameters, the fundamental physics describing the doppler-shift phenomena yields:

$$f_D = -(f_o/c)\dot{\rho} \quad (9)$$

where
$f_D$ = frequency received - frequency transmitted
$f_o$ = frequency transmitted
$c$ = velocity of propagation of signal (assumed to be constant and thus refraction effect is neglected for sake of simplicity)
$\dot{\rho}$ = range rate It is noted that range rate is a function of the satellite position and velocity coordinates and also the vehicle position and velocity coordinates. Assuming that the satellite coordinates are known and accurate, and referring to the perturbation of $f_D$, that results from small perturbations of vehicle position and velocity, $f_D$ can be thought of as a function of vehicle position and velocity according to $$f_D = F(\Lambda, \dot{\Lambda}, \lambda, \dot{\lambda}) \quad (10)$$

where the dependence on time and satellite parameters (not subject to perturbation) is suppressed, and where
$\Lambda, \dot{\Lambda}$ = vehicle longitude and longitude rate
$\lambda, \dot{\lambda}$ = vehicle latitude and latitude rate Note that it is assumed that the altitude error is zero in this example, which is a good approximation in a marine application. The perturbed $f_D$ resulting from perturbing the explicit variables is then given by $$\delta f_D = \frac{\partial F}{\partial \Lambda}\delta\Lambda + \frac{\partial F}{\partial \dot{\Lambda}}\delta\dot{\Lambda} + \frac{\partial F}{\partial \lambda}\delta\lambda + \frac{\partial F}{\partial \dot{\lambda}}\delta\dot{\lambda} \quad (11)$$

Now, $f_D$ and $\dot{\rho}$ differ only by the scale factor $-(f_o/c)$, so Equation 11 can be rewritten in terms of $\dot{\rho}$ as $$\delta f_D = -\left(\frac{f_0}{c}\right)\left[\frac{\partial \dot{\rho}}{\partial \Lambda}\delta\Lambda + \frac{\partial \dot{\rho}}{\partial \dot{\Lambda}}\delta\dot{\Lambda} + \frac{\partial \dot{\rho}}{\partial \lambda}\delta\lambda + \frac{\partial \dot{\rho}}{\partial \dot{\lambda}}\delta\dot{\lambda}\right] \quad (12)$$

It can be seen now that if the inertial system computes the doppler shift based on its own estimate of its position and velocity, errors in these estimates will reflect into the computed $f_D$ in accordance with Equation 12. When the computed and received frequencies are compared, the difference becomes a measure of a linear combination of position and velocity errors, including, perhaps by additive noise. Thus one obtains the $a_1, a_2, a_3, a_4$ coefficients from the partial derivatives indicated in Equation (12) after making an appropriate change of variables to the state variables of the inertial error model given by Equation (2) through (6). For the latitude-longitude coordinate system of this example, the appropriate relationships are $$\delta\theta_x = \delta\Lambda \cos\lambda \quad (13)$$

$$\delta\theta_y = \delta\lambda \quad (14)$$

Thus, Equation (12) can be rewritten as $$\delta f_D = \left(-\frac{f_0}{c \cos\lambda}\frac{\partial \dot{\rho}}{\partial \Lambda}\right)\delta\theta_x + \left(-\frac{f_0}{c \cos\lambda}\frac{\partial \dot{\rho}}{\partial \dot{\Lambda}}\right)\delta\dot{\theta}_x$$
$$+ \left(-\frac{f_0}{c}\frac{\partial \dot{\rho}}{\partial \lambda}\right)\delta\theta_y + \left(-\frac{f_0}{c}\frac{\partial \dot{\rho}}{\partial \dot{\lambda}}\right)\delta\dot{\theta}_y \quad (15)$$

and the terms in parentheses are the $a_1, a_2, a_3, a_4$ coefficients. It now remains to write these explicitly in terms of the geometry shown in FIG. 3. Note that the slow moving vehicle assumption permits the approximation $\delta\dot{\theta}_x = \delta\dot{\Lambda}\cos\lambda$.

From FIG. 3 we see that the position coordinates of the vehicle and satellite are given by

VEHICLE COORDINATES

$$X = R \cos\lambda \sin(\Lambda + \Omega t)$$

$$Y = R \sin\lambda \quad (16)$$

$$Z = R \cos\lambda \cos(\Lambda + \Omega t)$$

SATELLITE COORDINATES

$$X_s = R_s \cos\lambda_s \sin\Lambda_s$$

$$Y_s = R_s \sin\lambda_s \quad (17)$$

$$Z_s = R_s \cos\lambda_s \cos\Lambda_s$$

The radial distance between the satellite and the vehicle is seen to be $$\rho = [(X-X_s)^2 + (Y-Y_s)^2 + (Z-Z_s)^2]^{\frac{1}{2}} \quad (18)$$

Now, for the sake of simplicity in this example, we shall assume both $R$ and $R_s$ to be constant; and, with this assumption, the range rate can be written as $$\dot{\rho} = -1/\rho [X\dot{X}_s + X_s\dot{X} + Y\dot{Y}_s + Y_s\dot{Y} + Z\dot{Z}_s + Z_s\dot{Z}] \quad (19)$$

Equations (16), (17), and (18) can now be substituted directly into Equations (19); and an explicit expression for $\dot{\rho}$ in terms of $R, R_s, \lambda, \Lambda, \lambda_s,$ and $\Lambda_s$ is obtained. The partial derivatives indicated in Equation (15) can then be found and the desired $a_1, a_2, a_3, a_4$ coefficients determined. The results are indicated on the following page. In order to save space the terms "sine", "cosine", and "$\Omega t$" are denoted respectively by $S, C,$ and $\beta$, and $C_1 = X_s, C_2 = Y_s, C_3 = Z_s, C_4 = \dot{X}_s, C_5 = \dot{Y}_s, C_6 = \dot{Z}_s$.

$$a_1 = \frac{f_o \cdot R}{c \cdot C_\lambda} \frac{\begin{Bmatrix} C_4 C_\lambda C_{\Lambda+\beta} + C_1[-C_\lambda S_{\Lambda+\beta}(\dot{\Lambda}+\Omega) \\ -\dot{\lambda}S_\lambda C_{\Lambda+\beta}] - C_6 C_\lambda S_{\Lambda+\beta} \\ -C_3[C_\lambda C_{\Lambda+\beta}(\dot{\Lambda}+\Omega) - \dot{\lambda}S_\lambda S_{\Lambda+\beta}] \end{Bmatrix}}{\{R^2+R_s^2-2R[C_1C_\lambda S_{\Lambda+\beta}+C_2S_\lambda+C_3C_\lambda C_{\Lambda+\beta}]\}^{1/2}}$$

$$+\frac{f_o \cdot R^2}{c \cdot C_\lambda} \frac{\begin{Bmatrix} C_4 C_\lambda S_{\Lambda+\beta} + C_1[C_\lambda C_{\Lambda+\beta}(\dot{\Lambda}+\Omega) - \dot{\lambda}S_\lambda S_{\Lambda+\beta}] \\ + C_5 S_\lambda + C_2\dot{\lambda}C_\lambda + C_6 C_\lambda C_{\Lambda+\beta} \\ - C_3[C_\lambda S_{\Lambda+\beta}(\dot{\Lambda}+\Omega) + \dot{\lambda}S_\lambda C_{\Lambda+\beta}] \end{Bmatrix} \begin{Bmatrix} C_1 C_\lambda C_{\Lambda+\beta} \\ -C_3 C_\lambda S_{\Lambda+\beta} \end{Bmatrix}}{\{R^2+R_s^2-2R[C_1C_\lambda S_{\Lambda+\beta}+C_2S_\lambda+C_3C_\lambda C_{\Lambda+\beta}]\}^{3/2}}$$

$$(20)$$

$$a_2 = \frac{f_o \cdot R}{c \cdot C_\lambda} \frac{\{C_1 C_\lambda C_{\Lambda+\beta} - C_3 C_\lambda S_{\Lambda+\beta}\}}{\{R^2+R_s^2-2R[C_1C_\lambda S_{\Lambda+\beta}+C_2S_\lambda+C_3C_\lambda C_{\Lambda+\beta}]\}^{1/2}} \quad (21)$$

$$a_3 = \frac{f_o \cdot R}{c} \frac{\begin{bmatrix} -C_4 S_\lambda S_{\Lambda+\beta} - C_1[S_\lambda C_{\Lambda+\beta}(\dot{\Lambda}+\Omega) \\ +\dot{\lambda} C_\lambda S_{\Lambda+\beta}] + C_5 C_\lambda - C_2 \dot{\lambda} S_\lambda - C_6 S_\lambda C_{\Lambda+\beta} \\ +C_3[S_\lambda S_{\Lambda+\beta}(\dot{\Lambda}+\Omega) - \dot{\lambda} C_\lambda C_{\Lambda+\beta}] \end{bmatrix}}{\{R^2 + R_s^2 - 2R[C_1 C_\lambda S_{\Lambda+\beta} + C_2 S_\lambda + C_3 C_\lambda C_{\Lambda+\beta}]\}^{1/2}}$$

$$+ \frac{f_o \cdot R^2}{c} \frac{\begin{bmatrix} C_4 C_\lambda S_{\Lambda+\beta} + C_1[C_\lambda C_{\Lambda+\beta}(\dot{\Lambda}+\Omega) - \dot{\lambda} S_\lambda S_{\Lambda+\beta}] \\ +C_5 S_\lambda + C_2 \dot{\lambda} C_\lambda + C_6 C_\lambda C_{\Lambda+\beta} \\ -C_3[C_\lambda S_{\Lambda+\beta}(\dot{\Lambda}+\Omega) + \dot{\lambda} S_\lambda C_{\Lambda+\beta}] \end{bmatrix} \begin{bmatrix} -C_1 S_\lambda S_{\Lambda+\beta} \\ +C_2 C_\lambda \\ -C_3 S_\lambda C_{\Lambda+\beta} \end{bmatrix}}{\{R^2 + R_s^2 - 2R[C_1 C_\lambda S_{\Lambda+\beta} + C_2 S_\lambda + C_3 C_\lambda C_{\Lambda+\beta}]\}^{3/2}}$$

(22)

$$a_4 = \frac{f_o \cdot R}{c} \frac{\{-C_1 S_\lambda S_{\Lambda+\beta} + C_2 C_\lambda - C_3 S_\lambda C_{\Lambda+\beta}\}}{\{R^2 + R_s^2 - 2R[C_1 C_\lambda S_{\Lambda+\beta} + C_2 S_\lambda + C_3 C_\lambda C_{\Lambda+\beta}]\}^{1/2}} \quad (23)$$

C. RESULTS OF COMPUTER SIMULATION

In order to demonstrate the effectiveness of the navigation system herein described, simulation studies were carried out on an IBM 360/50 computer. The geometric situation chosen consisted of three satellites in circular polar orbits at an altitude of approximately 500 nautical miles. The orbital planes of the satellites were spaced 60 deg. apart with the plane of the "first" one being 30° east of the initial longitude of the vehicle. For the sake of convenience, it was assumed that all three satellites cross the pole at the same time, and that the vehicle was located at approximately 45 deg. latitude on the surface of the earth.

The numerical values chosen for the random inputs were as follows:
1. Gyro "biases" (each axis): Markov with an rms value of 0.01 deg/hr and a time constant of 10 hr.
2. Accelerometer "biases" (each channel): Markov with an rms value of 10 sec of arc and a time constant of 10 hr.
3. Noninertial velocity reference errors (each channel and only for the run where this measurement was included in the model): $1/\sqrt{2}$ knot uncorrelated (white) sequence plus $1/\sqrt{2}$ knot rms Markov with a time constant of 1 hr.
4. Satellite frequency uncertainties (for each satellite and including miscellaneous effects such as orbital parameter uncertainties): $\sqrt{2}$ Hz uncorrelated (white) sequence plus 2 Hz rms Markov with a time constant of 1 hr. Two situations were simulated using Doppler frequency as the observable
1. Run 1. A pure inertial system augmented only with the doppler-frequency data from the three satellites.
2. Run 2. A pure inertial system augmented with both doppler-frequency data from three satellites and a noninertial velocity reference that was assumed to be available at each Kalman-filter updating point throughout the run.

The updating time interval for the Kalman filter was chosen to be 2 minutes when the satellite was not within range, and 10 seconds when within range (approximately 25° above the horizon). The switch to finer resolution when doppler data was available was felt to be both necessary and realistic in view of the relatively short time interval of any particular pass. Ideally, one would process the augmenting data on a continuous basis. However, in this case a discrete Kalman filter was assumed, and thus the basic time interval of the recursive process must be nonzero.

Figure 5:
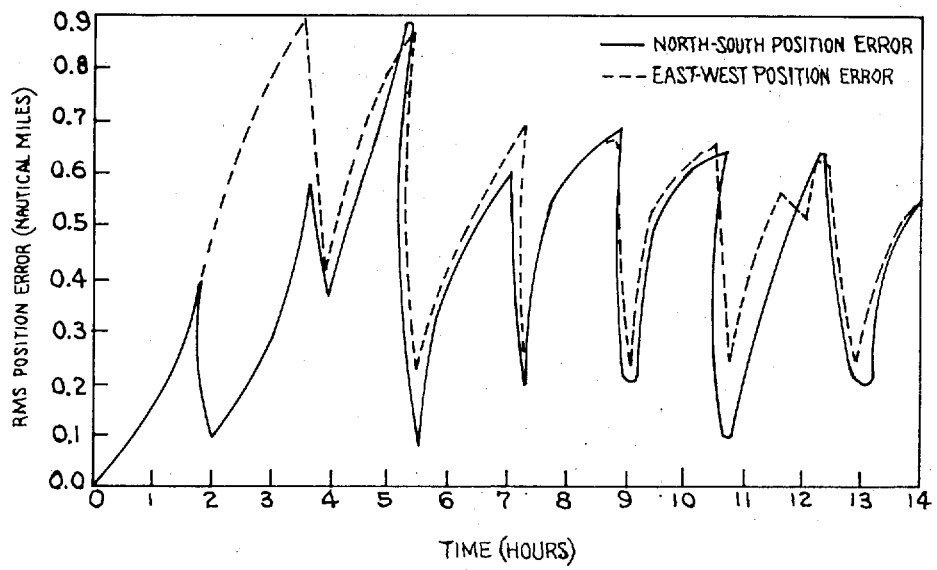
FIG. 5 illustrates the propagation of system errors with increased time for the example wherein Doppler frequency is used as the observable.

The resulting rms position errors from Run 1 are shown in FIG. 5. In this run, all initial errors (i.e., states) were assumed to be zero, and the plot of FIG. 7 shows the evolution of the system errors beginning with the zero-initial-condition situation and progressing to the steady-state condition. It can be seen that the position errors approach a bounded steady-state condition, thus showing the effectiveness of the technique. It was also noted from the simulations that all states approach a bounded steady-state condition.

The results of Run 2 were similar to those of Run 1, except that the rms errors were reduced by about 25 percent. Thus, for this example, the addition of external velocity reference information improved the system performance somewhat, but it did not drastically change the overall character of the error propagation.

EXAMPLE II

Frequency Count as the Measurement

As already mentioned, it may be desirable in some applications to use the frequency count directly as the measurement in the Kalman filter. The Kalman filter can be modified to accommodate this situation by noting that the doppler shift can be written in terms of range rate as:

$$f_D = -(f_o/c)\dot{\rho} \quad (9)$$

The integral of $f_D$ over the time interval $(t_{n-1}, t_n)$ is the Doppler count; and it is seen to be $$N(t_n) = -\left(\frac{f_o}{c}\right) \int_{t_{n-1}}^{t_n} \dot{\rho} \, dt = -\left(\frac{f_o}{c}\right)[\rho(t_n) - \rho(t_{n-1})]$$

(24)

where $\rho$ denotes the distance between the terrestrial vehicle and the satellite. Considering small perturbations of $\rho(t_n)$ and $\rho(t_{n-1})$ due to a small change in vehicle position (holding the satellite position fixed), a perturbation $\delta N(t_n)$ can be written as $$\delta N(t_n) = -(f_o/c)[\delta\rho(t_n) - \delta\rho(t_{n-1})] \quad (25)$$

The perturbations $\delta\rho(t_n)$ and $\delta\rho(t_{n-1})$ may be thought of as arising from the inertial system position errors; hence, $\delta N(t_n)$ has the physical interpretation of the difference between the measured doppler count and the predicted doppler count based on the inertial system's estimate of its position. To complete the measurement model then, $\delta\rho(t_n)$ and $\delta\rho(t_{n-1})$ are written in terms of the position errors $\delta\theta_x$, $\delta\theta_y$, and $\delta R_z$ (note altitude error is now included). If the perturbations are small, the connection is linear and may be written in general terms as $$\delta\rho(t_n) = a_n \delta R_z(t_n) + b_n \delta\theta_x(t_n) + c_n \delta\theta_y(t_n) \quad (26)$$

where $a_n$, $b_n$, $c_n$ are coefficients that depend on the satellite and inertial coordinate data, but are computable on a real-time basis for each $t_n$. The final measurement equation is then obtained by substituting Eq. (26) into (25), resulting in:

$$\delta N(t_n) = -(f_o/c)[a_n \delta R_z(t_n) + b_n \delta\theta_x(t_n) + c_n \delta\theta_y(t_n)$$
$$-a_{n-1}\delta R_z(t_{n-1}) - b_{n-1}\delta\theta_x(t_{n-1}) - c_{n-1}\delta\theta_y(t_{n-1})] +$$
$$\text{Measurement Noise} \quad (27)$$

The "measurement" $\delta N(t_n)$ is linearly connected to the previous as well as the present states to be estimated. This calls for a modification of the Kalman recursive equations because the measurement relationship is now of the more general form.

$$y_n = M_n x_n + N_n x_{n-1} + \text{Meas. Noise} \quad (28)$$

rather than the "usual" simpler form $$y_n = M_n x_n + \text{Meas. Noise} \quad (29)$$

The modified Kalman recursive equations are developed in detail by R. G. Brown and G. L. Hartman, "Kalman Filter With Delayed States as Observables," Proc. of the National Electronics Conference, Vol. 24, 1968, pp. 67–72. (Note that there is an error in this reference. In the second line of Eq. 16, $Q_{n-1}$ should be changed to $\phi_{n-1}$ in two places). The derivation is not repeated here. The modified equations can be summarized as follows:

MODEL OF THE PROCESS TO BE ESTIMATED AND THE MEASUREMENT RELATIONSHIP $$x_{n+1} = \phi_n x_n + g_n \quad (30)$$

$$y_n = M_n x_n + N_n x_{n-1} + \delta y_n \quad (31)$$

MODIFIED KALMAN RECURSIVE EQUATIONS $$b_n = (P_n^* M_n^T + \phi_{n-1} P_{n-1} N_n^T) Q^{-1} \quad (32)$$

$$P_n = P_n^* - b_n Q b_n^T \quad (33)$$

where $$Q = (M_n P_n^* M_n^T + V_n) + N_n P_{n-1} N_n^T + N_n P_{n-1} \phi_{n-1}^T M_n^T + M_n \phi_{n-1} P_{n-1} N_n^T \quad (33a)$$

$$\hat{x}_n = \hat{x}_n' + b_n(y_n - \hat{y}_n') \quad (34)$$

where $$\hat{y}_n' = M_n \hat{x}_n' + N_n \hat{x}_{n-1} \quad (34a)$$

$$\hat{x}'_{n+1} = \phi_n \hat{x}_n \quad (35)$$

$$P_n^* = \phi_{n-1} P_{n-1} \phi^T_{n-1} + H_{n-1} \quad (36)$$

The notation used in Equations (32) through (36) is the same as that in Equations (K-1) through (K-5) above.

One can now proceed with the Kalman filter operation in a manner similar to Example I except that in this case, (1) the measurement or observable is the difference between the received and computed Doppler counts, (2) recursive Equations (32) through (36) are used in place of Equations (K-1) through (K-5), and (3) the variable measurement coefficients are the "a,b,c" parameters of Eq. (27) rather than $a_1, a_2, a_3, a_4$ as defined by Eqs. (21)–(23). The equations for the a,b,c, parameters are derived in the Brown-Hartman reference and are:

$$a_n = (R - R_s C_{zz}/\rho\lambda_o) \quad (37)$$

$$b_n = (RR_s C_{yz}/\rho\lambda_o) \quad (38)$$

$$c_n = -(RR_s C_{yz}/\rho\lambda_o) \quad (39)$$

where
$R$ = Radial distance from center of earth to the vehicle
$R_s$ = Radial distance from center of earth to the satellite
$\rho$ = Distance from vehicle to satellite
$C_{xz}$, $C_{yz}$, $C_{zz}$ = Direction cosines between the vehicle xyz axes and the radial vector to the satellite
$\lambda_o$ = Wavelength of satellite signal In order to demonstrate the feasibility of the Kalman filter method of system integration with Doppler counts as the observable, a computer program was written to process actual flight test data after the flight had taken place. As a matter of programming convenience, the program was written in FORTRAN and is illustrated in FIGS. 5A–5K. The program was run on an IBM 360 system at the Iowa State University Computation Center, Ames, Iowa.

The articular flight test data for which the program was written consisted of (1) aircraft motion data, (2) outputs of a strapped-down inertial navigation system, and (3) satellite Doppler-count and coordinate data. These data then served as the input data to the Kalman filter program, and the resultant outputs were the estimates of the various error states of the system, which would be compensated in the real-time system operation. The system states chosen for this application were as follows:

$x_1, x_2, x_3$ = xyz components of $\psi$ error
$x_4, x_5$ = x position and velocity errors
$x_6, x_7$ = y position and velocity errors
$x_8$ = altitude error
$x_9, x_{10}, x_{11}$ = xyz gyro bias errors
$x_{12}, x_{13}, x_{14}$ = xyz accelerometer bias errors
$x_{15}$ = vertical velocity error
$x_{16}$ = doppler count bias error This program has been run successfully at the Iowa State University Computation Center.

The program listed in FIGS. 5A–5K is intended only to illustrate the Kalman filter mode of operation. In a real-time (on-line) application many simplifications could be made such as rewriting in machine language rather than FORTRAN, elimination of diagnostic statements, and so forth.

Having thus described in detail preferred embodiments of the present invention, it will be apparent to persons skilled in the art that certain modifications may be made to the structure illustrated and that equivalent elements may be substituted for those which have been described; and it is, therefore, intended that all such modifications and substitutions be covered as they are embraced within the spirit and scope of the invention.

I claim:

1. Terrestrial navigation apparatus for a vehicle comprising means including inertial means for generating signals representative of the position and velocity of the vehicle, data processing means, a receiver for receiving data from a doppler-satellite system transmitting a reference signal as well as signals from which the satellite's position and velocity may be computed, difference means for generating a signal representative of the difference between the actual doppler frequency shift measured from the signals received from the satellite and the predicted doppler frequency shift computed by the inertial system, Kalman filter means in said data processor receiving said difference signal for generating a set of error signals representative of estimates of the errors in the position and velocity signals generated by said inertial sensors.

2. The system of claim 1 further comprising correction means receiving said error estimate signals for correcting said inertial means in response thereto.

3. The system of claim 2 wherein said inertial means includes a plurality of gyroscope means and accelerometer means associated with said gyroscope means, and wherein said Kalman filter means generates a set of error signals representative of estimates of errors in the biases of said gyroscope means and said accelerometer means.

4. The system of claim 3 further comprising means receiving said last-named error signals for correcting said biases.

5. The system of claim 1 wherein said difference signals are discrete frequency difference signals representative of the difference between the actual doppler shift frequency received from said satellite and a doppler frequency computed in said data processing means based on signals received from said inertial means.

6. The system of claim 1 wherein said difference signals are representative of the difference in frequency count between the actual doppler frequency count and a doppler frequency count computed in said data processing means based on signals received from said inertial means.

7. The system of claim 1 wherein said Kalman filter means includes a digital computer programmed to solve Equations (32) through (36) receiving a frequency count signal representative of a difference in received doppler shift frequency and a doppler shift frequency computed by said data processing means responsive to the output signals of said inertial means.

8. In a method of navigation for a vehicle having means for generating signals representative of position and velocity of the vehicle, the steps comprising receiving from an earth orbiting satellite signals indicative of the position and velocity of said satellite and a reference frequency signal, generating from said received signals a signal representative of an actual doppler shift in said reference frequency signal, generating a signal from said signals representative of position and velocity of said vehicle and said received signals a signal representative of a predicted doppler shift, comparing said actual doppler shift signal and said predicted doppler shift signal to generate a difference signal representative of the difference between said compared signals, and computing from said difference signals error signals representative of error estimates in said vehicle position and velocity signals, said step of computing comprising using discrete-time least-square filter techniques substantially as described.

9. The method of claim 8 further comprising generating from said difference signal signals representative of accelerometer bias errors, gyroscope bias errors and doppler bias errors.

10. The method of claim 8 wherein said difference signal is representative of a frequency count difference between the actual doppler shift of said reference signal received from said satellite and the frequency count computed based on an estimate of the vehicle's position and velocity from said inertial means.

* * * * *